J. G. SORGEN.
Heating Drum.

No. 62,699.

Patented March 5, 1867.

Witnesses:
Alexander Stuart
Henry R. Walton.

Inventor:
John G. Sorgen.
By his Attorney
J. Dennis Jr.

United States Patent Office.

JOHN G. SORGEN, OF KENTON, OHIO.

Letters Patent No. 62,699, dated March 5, 1867; antedated January 10, 1867.

---

IMPROVEMENT IN STOVE-PIPE DRUMS.

---

The Schedule referred to in these Letters Patent and making part of the same.

---

TO ALL WHOM IT MAY CONCERN:

Be it known that I, JOHN G. SORGEN, of Kenton, Hardin county, State of Ohio, have invented certain new and useful improvements in Stove-Pipe Drums; and I do hereby declare the following description and accompanying drawings are sufficient to enable any person skilled in the art or science to which it most nearly appertains to make and use my said invention or improvements without further invention or experiment.

The nature of my invention and improvements consists in providing stove-pipe heating drums, with deflecting cones arranged to deflect the hot gases or products of combustion against the sides of the drum, and from the sides to the centre again, so as to heat the drum fully and perfectly; also in making holes in the apexes of the deflecting cones, and providing them with valves to open and close the holes in the cones. In the accompanying drawings—

Figure 1:
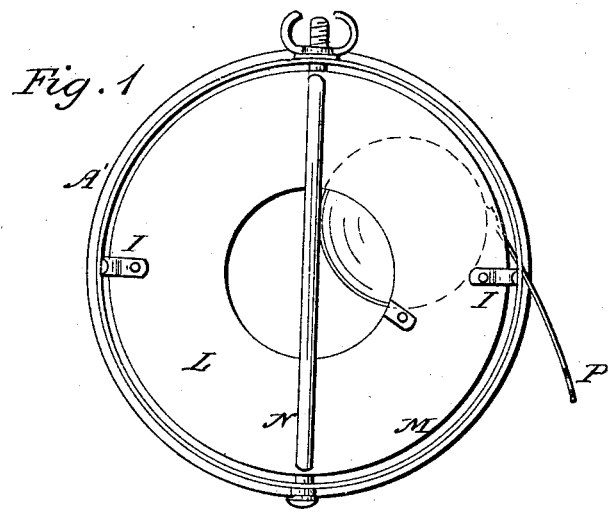
Figure 1 is a plan of the drum without the top, showing the interior.
Figure 2:
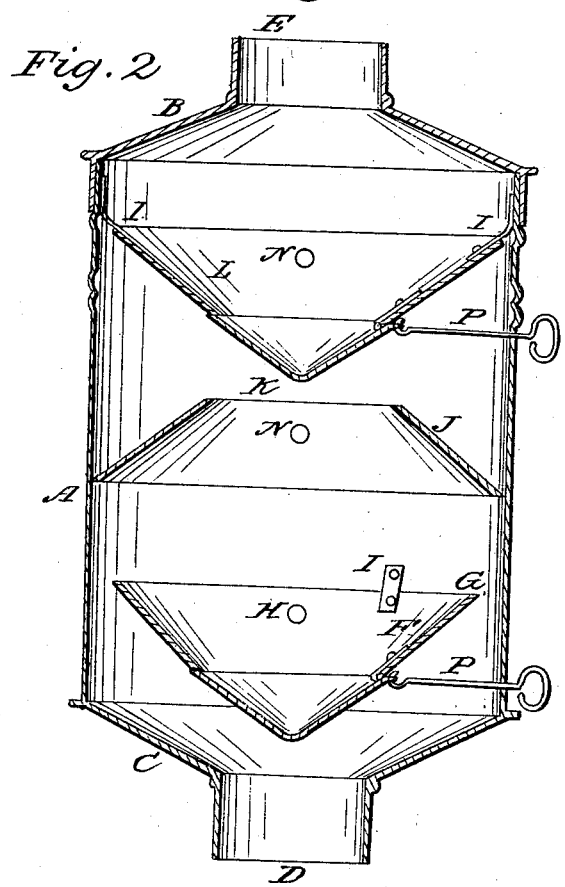
Figure 2 is a section of the drum and cones cut perpendicularly through the centre.

In these drawings, A is the cylinder of the drum, B the upper, and C the lower end. These ends may be made flat or conical, as shown in fig. 2, and provided with a pipe, D, to conduct the smoke and blaze from the fire into it, and a pipe, E, to conduct the smoke out. This drum may be made of sheet or cast metal, as may be preferred; and to compel the products of combustion to heat the sides of the drum I arrange the inverted cone F, in the lower part of the drum, in about the position shown in the drawing, fig. 2, and make it so much smaller than the drum that the space G will be sufficient to let the hot blaze and gases pass around the cone and in contact with the cylinder of the drum to heat it. This cone may be held in its place by the rod H, which passes through both the cylinder and the cone, and is provided with a nut to hold it in; and to prevent the cone from tipping, a bracket, I, may be fastened to the cylinder and the cone. Above the inverted cone F I arrange the frustum of a cone, J, which is made large enough to fill the cylinder, with an opening, K, for the blaze and smoke to pass up, being deflected from the cylinder to the centre of the cone, and after they pass through the opening K they are deflected against the cylinder again by the inverted cone L, which is made so much smaller than the cylinder A as to leave sufficient room for the smoke and gases to pass between its outer edge and the cylinder through the space M and then pass out of the drum through the pipe E. The cones J and L may be held in their places by the rods N N and brackets I, or by brackets only, if preferred that way. To let the blaze and smoke pass through the drum without heating it much when the heat is not wanted, I cut off the lower ends of the cones F and L so as to make openings about the size of K in the cone J, or of the pipes at the ends of the drum, and hinge the points of the cones so cut off so that they can be swung one side by the rod P and leave the hole in the centre of the cone open so that the smoke and blaze from the fire may pass right up through the centres of all the cones and heat the cylinder A but little when the heat is not wanted. These points of the cones are adjusted by the rods P P, which pass through the cylinder A, so that the person using the drum may graduate the heat at will.

Having described my improvements in heating-drums, I claim the deflecting cones F and L, and the frustum of a cone, J, arranged in relation to each other and the cylinder A, as set forth.

I also claim making the points of the deflecting cones movable, so that they can be swung from the opening in the cone to let the blaze and smoke pass up in the centre of the cylinder.

JOHN G. SORGEN.

Witnesses:
 BENJ. EGLIN,
 WILLIAM H. GARY.